United States Patent
DePuy et al.

(10) Patent No.: US 9,005,319 B2
(45) Date of Patent: Apr. 14, 2015

(54) TAR REMOVAL FOR BIOMASS GASIFICATION SYSTEMS

(75) Inventors: Richard Anthony DePuy, Burnt Hills, NY (US); Omprakash Mall, Bangalore (IN)

(73) Assignee: General Electric Company, Schenectady, NY (US)

( * ) Notice: Subject to any disclaimer, the term of this patent is extended or adjusted under 35 U.S.C. 154(b) by 896 days.

(21) Appl. No.: 13/157,636

(22) Filed: Jun. 10, 2011

(65) Prior Publication Data
US 2012/0313378 A1    Dec. 13, 2012

(51) Int. Cl.
| C10J 3/00 | (2006.01) |
| B01D 47/00 | (2006.01) |
| B01J 7/00 | (2006.01) |
| H02K 7/18 | (2006.01) |
| C10J 3/26 | (2006.01) |
| C10K 1/02 | (2006.01) |
| C10K 1/10 | (2006.01) |
| B01D 53/14 | (2006.01) |

(52) U.S. Cl.
CPC ... B01J 7/00 (2013.01); H02K 7/18 (2013.01); C10J 3/26 (2013.01); C10K 1/024 (2013.01); C10K 1/101 (2013.01); C10J 2300/0903 (2013.01); C10J 2300/169 (2013.01); B01D 53/1487 (2013.01)

(58) Field of Classification Search
CPC ...... C10J 2300/1603; C10K 1/00; C10K 1/18
USPC ................................................ 48/61; 95/149
See application file for complete search history.

(56) References Cited

U.S. PATENT DOCUMENTS

| 4,512,777 A | 4/1985 | Wild |
| 5,824,122 A | 10/1998 | Baumgartel |
| 2009/0229464 A1* | 9/2009 | Robertson ........................ 95/186 |
| 2010/0051875 A1* | 3/2010 | Chornet et al. ............... 252/373 |
| 2012/0121492 A1 | 5/2012 | Schaub et al. |

FOREIGN PATENT DOCUMENTS

| EP | 1 203 802 A1 | 8/2002 |
| EP | 1419222 B1 | 11/2005 |
| EP | 2267102 A1 | 12/2010 |
| PL | 141902 B1 | 9/1987 |
| PL | 173632 B1 | 4/1998 |

(Continued)

OTHER PUBLICATIONS

Williams, R.H. and Larson, E.D., Biomass Gasifier Gas Turbine Power Generating Technology, Biomass and Bioenergy, vol. 10, Nos. 2-3, pp. 149-166 (1996).

(Continued)

*Primary Examiner* — Matthew Merkling
(74) *Attorney, Agent, or Firm* — Fletcher Yoder, P.C.

(57) ABSTRACT

The disclosed embodiments provide systems for the removal and use of tar from a biomass gasification system. For example, in one embodiment, a biomass gasification system includes a reactor configured to gasify a biomass fuel in the presence of air to generate a producer gas. The system also includes an absorber configured to receive a mixture of the producer gas and tar and to absorb the tar into an organic solvent to produce treated producer gas and a rich solvent mixture containing at least a portion of the tar. The system further includes a recycle line configured to direct the rich solvent mixture to a biomass gasifier.

6 Claims, 4 Drawing Sheets

(56) References Cited

OTHER PUBLICATIONS

Shivakumar et al., Inventory of Existing Technologies on Biomass Gasification, Report 2008, submitted to: Department of Scientific and Industrial Research, Government of India, New Delhi, Karnataka State Council for Science and Technology, Indian Institute of Science, Bangalore—560012.

PL Search Report dated Oct. 12, 2012 from corresponding PL Application No. P399448, along with unofficial English translation.

* cited by examiner

TAR REMOVAL FOR BIOMASS GASIFICATION SYSTEMS

BACKGROUND OF THE INVENTION

The subject matter disclosed herein relates to biomass gasification systems and, more specifically, to the removal and processing of tar from producer gas generated by the system.

In biomass gasification processes, a solid fuel such as sawdust, agricultural wastes, wood wastes, and the like, is gasified to generate a gaseous fuel. The biomass generally includes polysaccharides that have been produced by photosynthesis, such as cellulose, hemicellulose, and lignin. During the gasification of these materials, the biomass, in the presence of air, is converted into a more combustible form, referred to as producer gas. In some systems, the producer gas may be combusted by an engine to produce electricity. In other systems, the producer gas may be used to generate heat or to generate substitute natural gas (SNG).

The producer gas includes combustible gases such as carbon monoxide (CO), hydrogen ($H_2$), and methane ($CH_4$), among others. In addition to producing the combustible gases noted above, the biomass gasification process also produces significant amounts of tar compared to other gasification processes. The tar may include molecules having a molecular weight higher than benzene ($C_6H_6$), including aromatic hydrocarbons, polyaromatic hydrocarbons (PAH's), heterocyclic aromatics, and the like. While certain tars may not have a substantial effect on the operation of a power plant having the biomass gasification system, other tars may condense and/or crystallize within certain equipment, thereby causing a reduction in plant efficiency and, in some situations, plant downtime.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a biomass gasification system includes a reactor configured to gasify a biomass fuel in the presence of air to generate a producer gas. The system also includes an absorber configured to receive a mixture of the producer gas and tar and to absorb the tar into an organic solvent to produce treated producer gas and a rich solvent mixture containing at least a portion of the tar. The system further includes a recycle line configured to direct the rich solvent mixture to a biomass gasifier.

In a second embodiment, a biomass gasification system includes a reactor configured to gasify a biomass fuel in the presence of air to generate a producer gas and an absorber configured to receive a mixture of the producer gas and tar. The absorber is also configured to absorb the tar into an organic solvent to produce treated producer gas and a rich solvent mixture containing at least a portion of the tar. The system also includes a cracking unit configured to break carbon-carbon bonds in the rich solvent mixture to generate a cracked solvent mixture, a separation unit configured to separate the cracked solvent mixture into a first stream having a first plurality of hydrocarbons and the solvent and a second stream having a second plurality of hydrocarbons. The first stream has a lower average molecular weight than the second stream. The system further includes a recycle line configured to direct the first stream to the absorber.

In a third embodiment, a biomass gasification system includes a reactor configured to gasify a biomass fuel in the presence of air to generate a producer gas and a water scrubbing unit configured to remove tar from the producer gas to generate a first stream having scrubbed producer gas and a second stream having a mixture of the removed tar and water. The system also includes a contactor unit configured to contact the mixture with an organic solvent to produce a third stream having dissolved tar, the organic solvent and the water. The system further includes a separation unit configured to remove the water from the third stream to generate a fourth stream having the organic solvent and the dissolved tar.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
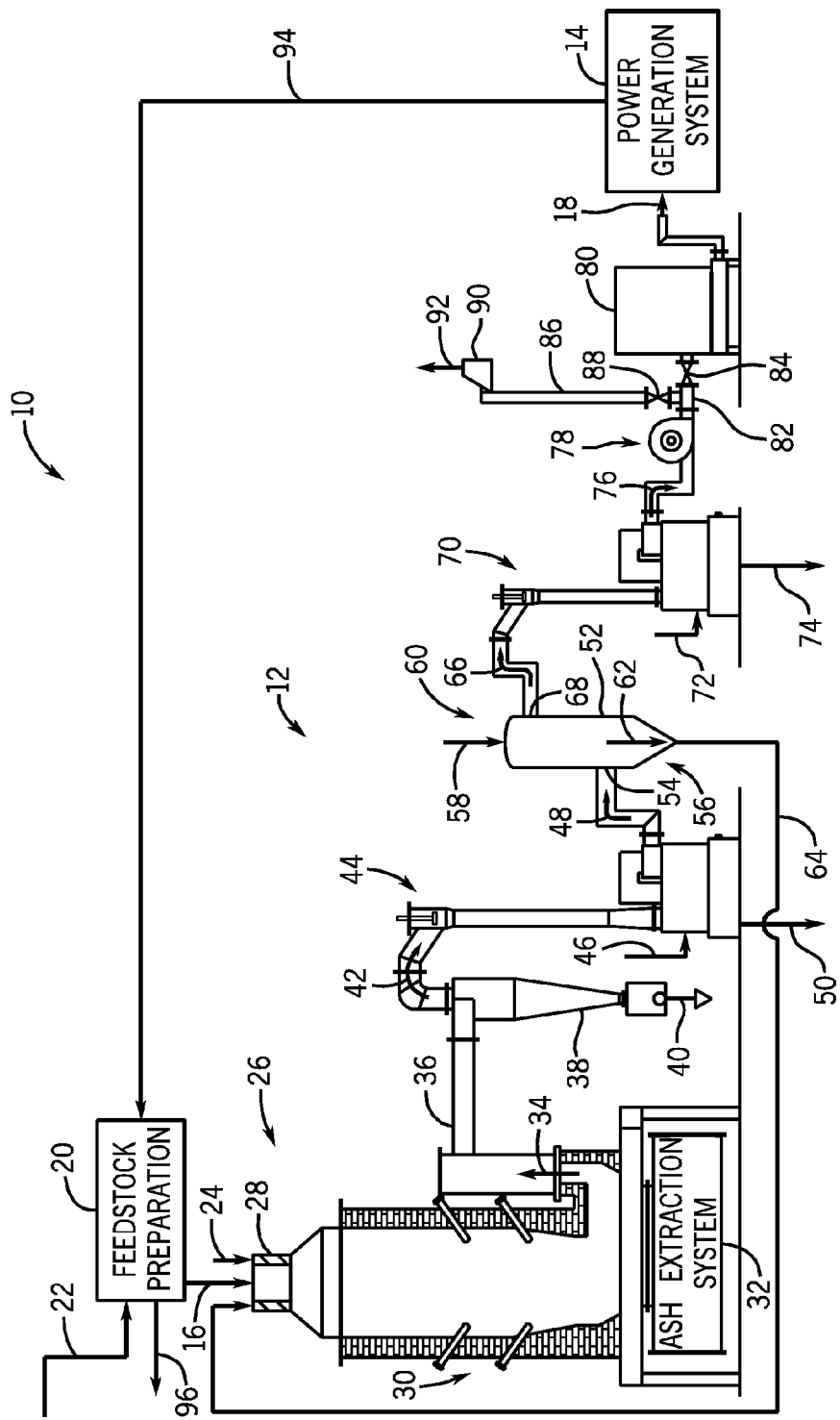
FIG. 1 is a schematic illustration of an embodiment of a biomass gasification system integrated with a power generation system, where the biomass gasification system has an absorber configured to remove at least a portion of tar within a producer gas produced by a biomass gasifier to produce a recycle stream that is recycled to the gasifier.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements.

The terms "comprising," "including," and "having" are intended to be inclusive and mean that there may be additional elements other than the listed elements.

As noted above, the formation of tar within a biomass gasification reactor can have deleterious effects on various plant system components. For example, because many of the components of tar have molecular structures that are polyaromatic, which allows facile sublimation and crystallization, these components are often carried along in the gas phase through a plant system in a gas mixture that includes the producer gas and the tar. As the tar components concentrate and cool, they begin to crystallize, rather than condensing into a liquid. Such crystallization can clog various plant system components, such as valves, intake ports, turbine inlets, and so on. Examples of tar components that can hinder the operation of plants in this way include hydrocarbyl molecules such as naphthalene and its derivatives, fluorene, phenanthrene, anthracene, fluoranthene, pyrene, benzo-anthracene, chrysene, benzo-fluoranthene, benzo-pyrene, perylene, indeno-pyrene, dibenzo-anthracene, benzo-perylene, and the like. Moreover, other tar components that can polymerize and clog certain plant features may be contained within the gas mixture. These components may polymerize due to high temperatures and/or other polymerization initiators encountered as the gas mixture flows through the plant system. Such polymerizable components can include, for example, styrene and its derivatives, as well as other olefins. Generally, the concentration of these components is related to whether the components will crystallize and/or polymerize, with higher concentrations leading to a higher probability of crystallization and/or polymerization, and clogging.

Other tar components, such as those that may not necessarily crystallize within the biomass gasification system, can contaminate scrubbing water used in aqueous scrubbing units and can also reduce the combustion efficiency of the gas mixture produced by biomass gasification systems. As an example, these tar components can include molecules that are soluble and/or miscible with water, such as pyridine, phenol, cresol, and quinoline. Other aromatics that are not soluble and/or miscible with water also may contaminate scrubbing water, albeit to a lesser extent than the molecules listed above. However, because molecules that are not soluble in water may be difficult to remove from the gas mixture, these molecules can reduce combustion efficiency. These molecules may include toluene, xylenes, mesitylene, and the like. Other tar components may have non-aromatic molecular structures, such as cyclic parrafins (e.g., cyclopentane, cyclohexane, cyclooctane, decaline), and may have any or a combination of the undesirable characteristics mentioned above.

In sum, many of the tar components noted above may be in the gaseous phase while in the biomass gasification system, may not be miscible in water, and may, generally, be entrained with the gas mixture produced by the gasification system. Therefore, it may be difficult to completely separate tar from the producer gas using typical plant features. Accordingly, the present embodiments provide systems for contacting the gas mixture with a solvent to remove at least a portion of the tar. The contacting systems described herein may be used in addition to, or in lieu of, cyclones, aqueous scrubbing units, filters, and the like. For example, the contacting systems may be disposed downstream of a cyclone, downstream and/or upstream of a scrubbing unit, downstream and/or upstream of a filter, and so on. The solvent may absorb or dissolve at least a portion of the tar components within the gas mixture, thereby reducing the concentration of the tar components. Moreover, because the solvent may, in some embodiments, be an organic solvent, the resulting mixture of solvent and tar components may be recycled to a gasifier. Indeed, in certain embodiments, the mixture of organic solvent and the tar components may be cracked, which generates molecules having a lower molecular weight than the original tar components. Because the cracking process may break one or more carbon-carbon bonds of the tar components, the aromaticity and/or polycyclic structure of certain tar components also may be disrupted. This disruption may lower the probability of crystallization and, in certain embodiments, may promote easier gasification when the cracked materials are recycled to the gasifier.

Keeping in mind that these systems and approaches towards tar reduction may be used in many gasification processes (e.g., entrained flow gasification processes), the disclosed embodiments will be discussed in the context of a biomass gasification system having a down-draft gasifier. FIG. 1 is a schematic illustration of a system 10, such as a plant system, that includes a biomass gasification system 12 integrated with a power generation system 14. Generally, the biomass gasification system 12 gasifies a biomass feedstock 16 to produce a treated producer gas 18 that can be directed to the power generation system 14 to generate power. In general, producer gas is a type of synthesis gas (syngas) that may be produced by the relatively low temperature (e.g., less than approximately 2000° C.) gasification of biomass in the presence of air. When compared to typical types of synthesis gas produced by coal gasification in the presence of oxygen, producer gas generally has a lower energy density due to $N_2$ dilution. For example, according to certain embodiments, producer gas may have an average energy density of approximately 3500-5000 $kJ/m^3$, while coal gasification syngas may have an average energy density of approximately 7500-9000 $kJ/m^3$. Thus, producer gas, as defined herein, is a gas produced from the gasification of a biomass feed to produce CO, $H_2$, and $CO_2$, as well as other components, and having a lower energy density than syngas formed by coal gasification.

The treated producer gas 18 is provided to the power generation system 14 as a fuel source. As an example, the treated producer gas 18 may be combusted within one or more engines (e.g., gas turbine engines) contained within the power generation system 14 to produce electricity. The treated producer gas 18 also may have a number of other uses, such as for the production of synthetic natural gas (SNG), for heating (e.g., in dryers, kilns, furnaces, boilers), and so on.

The system 10 includes a feedstock preparation unit 20, which prepares the biomass feedstock 16 using a biomass fuel source 22 and, if desirable, other additives such as fluxants. The biomass fuel source 22 may include agricultural wastes, wood, saw dust, and the like. The feedstock preparation unit 20 may condition the biomass fuel source 22 to generate the biomass feedstock 16. The conditioning may include selecting, sizing, and/or drying the biomass fuel source 22, as well as mixing the biomass fuel source 22 with other additives. After preparation, the biomass feedstock 16 is directed, along with air 24, to a biomass gasifier 26. While the biomass gasifier 26 is discussed and presented as a down-draft gasifier, it should be noted that other types of biomass gasifiers are also presently contemplated, including updraft gasifiers.

The illustrated biomass gasifier 26 is an open air gasifier having an inlet 28 that enables the gasifier 26 to receive a substantially constant influx of the air 24 and the biomass feedstock 16. A series of reactions, which are collectively referred to as the gasification process, occur within the biomass gasifier 26. The process begins with combustion of the biomass feedstock 16 with the air 24. The biomass within the biomass feedstock 16 is combusted at sub-stoichiometric fuel-to-air ratios to produce, along with some CO and $H_2$, carbon dioxide ($CO_2$), water ($H_2O$), and a hot char or hot ash bed. The biomass gasifier 26 includes a plurality of air inlets 30 (e.g., nozzles) that are configured to allow air 24 to enter the biomass gasifier 26 to promote this combustion reaction. According to certain embodiments, the air inlets 30 may spaced circumferentially around the biomass gasifier 26.

The combustion reaction, which is an oxidation reaction, is exothermic and produces, in certain embodiments, temperatures within the biomass gasifier 26 of between approximately 1300 Kelvin (K) and 1600 K. As an example, the temperatures within the biomass gasifier 26 may reach approximately 1300 K, 1350 K, 1400 K, 1450 K, 1500 K, 1550 K, 1600 K, or more during the sub-stoichiometric combustion reaction. The $CO_2$ and $H_2O$ produced by the combustion reaction may pass through, or otherwise contact, the char or ash bed and undergo a reduction to generate CO, $H_2$, and some $CH_4$. The biomass gasifier 26 also includes an ash extraction system 32 that is configured to extract any remaining ash that remains from the gasification process.

The reduction reaction that is performed to produce the CO and $H_2$ is endothermic, and therefore requires heat. The bulk of the reduction reaction may therefore use heat produced by the combustion reaction, and also any latent heat from the hot char or ash bed. Moreover, because the biomass gasifier 26 is an open-top gasifier, the temperatures within the gasifier 26 may also be reduced by a substantially constant influx of the air 24. Other materials are generated from the gasification process in addition to the desired $CO_2$ and $H_2$ gases, including tar. As defined herein, tar is intended to denote any hydrocarbyl, such as aromatic hydrocarbons, heteroaromatics, polyaromatic hydrocarbons, heterocycles (not necessarily aromatic) and derivatives thereof having a molecular weight greater than benzene ($C_6H_6$, approximately 78 grams per mole) and that are produced in the gasification process described above. Other non-limiting examples of tar molecules are provided above prior to the discussion of FIG. 1.

The reduction reaction, as noted above, produces CO, $H_2$, tar, and other gases (e.g., diluent $N_2$, acid gases). The combination of these gases, which is an untreated gas mixture 34 represented as an arrow, exits an outlet 36 of the biomass gasifier 26 at a temperature between approximately 600 and 1300 K, 700 and 1200 K, 800 and 1100 K, or 900 and 1000 K. In the illustrated embodiment, the untreated gas mixture 34 is directed to a cyclone 38. The cyclone 38 removes a substantial portion of particulates 40 that may be present in the untreated gas mixture 34 to produce a first gas mixture 42.

The first gas mixture 42, represented as an arrow, is then sent to a first scrubbing unit 44. The first scrubbing unit 44 is configured to receive an influx of water 46 that removes particulates from the first gas mixture 42 via nucleation. Moreover, the water 46 removes at least a portion of water-soluble components, and in some embodiments, tar that may be present within the first gas mixture 42. Thus, the first scrubbing unit 44 produces a second gas mixture 48, represented as an arrow, as well as blackwater 50. The blackwater 50 may include tar, dissolved gases (e.g., acid gases and a minor amount of CO, $H_2$, and $CO_2$), and some small particulates not removed in the cyclone 38. The blackwater 50 may be sent to water treatment or similar facilities for purification.

In accordance with the present approaches, in the illustrated embodiment, the second gas mixture 48 is sent to a contactor 52. It should be noted that while the illustrated embodiment depicts the system 10 as having one scrubbing unit prior to the contactor 52, in other embodiments, any number of scrubbing units may be disposed upstream of the contactor 52. For example, in certain embodiments, the gas mixture 42 may be scrubbed once or several times prior to being sent to the contactor 52. Further, in certain embodiments, the scrubbing unit 44 may be omitted and the contactor 52 may receive the first gas mixture 42 directly from the cyclone 38.

In the illustrated embodiment, the contactor 52 is configured to receive the second gas mixture 48 at an inlet 54 proximate to a lower portion 56 of the contactor 52. The contactor 52 also receives a solvent flow 58 proximate to an upper portion 60 of the contactor 52. Within the contactor 52, the solvent flow 58 contacts the second gas mixture 48 (e.g., via countercurrent flow), and removes at least a portion of the tar contained within the second gas mixture 48. Therefore, in certain embodiments, the contactor 52 may be an absorber having features for increasing gas-liquid contact to facilitate removal of the tar by the solvent. For example, as discussed herein, the absorber may include one or a plurality of absorption columns. The removal of tar by the solvent flow 58 reduces the tar concentration of the second gas mixture 48.

The solvent flow 58 may include any solvent that is capable of dissolving and/or absorbing at least some of the tar within the second gas mixture 48. Because the tar components are organic molecules, the solvent flow 58 may include an organic solvent in addition to or in lieu of an aqueous solvent (e.g., water). In some embodiments, the solvent flow 58 may include an aqueous solvent having one or more surfactants that enable the aqueous solvent to dissolve the organic tar. Surfactants used for this purpose may include alkyl sulfates, alkyl ammoniums, glycols, alkyl acids, and the like.

Organic solvents that may be used as all or at least a portion of the solvent flow 58 include any organic solvent that is substantially in the liquid phase at the conditions within the contactor 52. As an example, the temperature within the contactor 52 may range between approximately 300 K and 500 K for most solvents, such as between approximately 325 K and 475 K, 350 K and 450 K, or 375 K and 425K. The particular temperature of the contactor 52 may depend at least on the type of solvent used as well as the tar composition. Thus, in certain embodiments, the temperature within the contactor 52 may be approximately 300, 350, 400, 450, 500 K, or higher. Generally, the organic solvent will have 10 carbons or less so as to remain a liquid at the conditions within the contactor 52, and also to facilitate gasification, as is discussed below. For example, the solvent may have 10, 9, 8, 7, 6, or fewer carbon atoms per solvent molecule. In certain embodiments, the organic solvent may be an aliphatic hydrocarbon, an aromatic hydrocarbon, or a combination thereof, and may have various functionalities including any of acids, alcohols, aldehydes, esters, or a combination thereof, and so on. Non-limiting examples of such solvents include benzene, toluene, xylene, mesitylene, acetic acid, formic acid, methanol, ethanol, propanol, butanol, pentanol, hexanol, formaldehyde, acetaldehyde, methyl acetate, ethyl acetate, and the like. In certain embodiments, the organic solvent may include molecules having a similar or the same structure as some of the components of the tar. The organic solvent chosen may also depend on availability, cost, recyclability, and other similar considerations. In one embodiment, the solvent flow 58 includes xylene.

The solvent flow 58 dissolves, absorbs, or otherwise entrains at least a portion of the tar within the second gas mixture 48 to generate a stream 62 containing a mixture of solvent and tar that exits proximate the lower portion 56 of the contactor 52. In the illustrated embodiment, the stream 62 is directed through a recycle line 64 and to the inlet 28 of the biomass gasifier 26. Therefore, the tar produced as a by-product of the gasification process may be recycled back to the gasifier 26 and subjected to gasification conditions. The gasification conditions may cause at least a portion of the solvent, the tar, or a combination of both, to crack and undergo gasification. Moreover, in some embodiments, the tar within the stream 62 may be separated from the solvent in the stream 62, and the tar may be provided to the inlet 28 of the gasifier 26.

In addition to producing the stream 62 that contains solvent and tar, a third gas mixture 66 is produced within the contactor 52. The third gas mixture 66 has a lower tar concentration than the second gas mixture 48. For example, the tar concentration of the third gas mixture 66 may be between approximately 10 and 99% lower than the second gas mixture 48, such as between approximately 15 and 90%, 20 and 85%, 25 and 80%, 30 and 70%, or 40 and 60% lower. The third gas mixture 66 exits an outlet 68 proximate to the upper portion 60 of the contactor 52, and is then directed to a chilled water scrubbing unit 70, where the third gas mixture 66 undergoes desiccation and scrubbing.

To perform desiccation and scrubbing, the chilled water scrubbing unit 70 receives a stream of chilled water 72 from a chilled water source. The stream of chilled water 72 may be atomized and contacted with the third gas mixture 66, which causes the third gas mixture to cool. As an example, the temperature of the chilled water 72 in the chilled water scrubbing unit 70 may be between approximately 265 and 400 K. According to certain embodiments, the chilled water 72 may be between approximately 265 and 400 K, 300 and 375 K, or 325 and 350 K. Because the chilled water 72 has a temperature below the boiling point of water, a substantial portion of any water contained within the third gas mixture 66 may condense. This condensation may desiccate the third gas mixture 66. The chilled water 72, which is atomized in the chilled water scrubbing unit 70, also scrubs the third gas mixture 66 to remove a substantial portion of any particulates that may be present. Therefore, the chilled water 72 may absorb or otherwise entrain particulates, as well as acid gases and the like, to produce a stream of greywater 74. The stream of greywater 74 may be sent to a chilled water tank, a water treatment facility, or a similar plant feature.

A fourth gas mixture 76 resulting from the desiccation and scrubbing in the chilled water scrubbing unit 70 is then passed through a blower 78, which provides motive force to direct the gases and other light materials through the gasification system 12. The fourth gas mixture 76 is then sent to a filter system 80. The filter system 80 includes one or more filters designed to remove dust from the fourth gas mixture 76. A conduit 82 connecting the chilled water scrubbing unit 70 with the filter 80 includes a first valve 84 configured to stop, start, increase, or decrease a flow rate of the fourth gas mixture 76 through the conduit 82. Indeed, in certain embodiments, it may be desirable to reduce or stop the flow of the fourth gas mixture 74. For example, in one embodiment, it may be desirable to reduce the pressure of the system 12. In other embodiments, the filter 80 may be under service. Accordingly, the first valve 84 may close and send a flow of the fourth gas mixture 76 into a divergent conduit 86. Specifically, a second valve 88 may open the flow of the fourth gas mixture 76 to the divergent conduit 86, which leads to a flare 90. The flare 90 may burn the fourth gas mixture 74, for example as a pressure release.

During normal operation of the system 12, most or all of the fourth gas mixture 74 is sent to the filter system 80. The filter system 80, as noted above, removes dust to from the fourth gas mixture 74 produce the treated producer gas 18. The treated producer gas 18 is then provided to the power generation system 14, which, according to certain embodiments, may be a Jenbacher system having a prime mover such as a compression or spark ignition engine. In other embodiments, the power generation system 14 may include one or more gas turbine engines. In certain embodiments, the engine may drive a generator that produces electricity. However, in other embodiments, the power generation system 14 may be any suitable type of power generation system. Exhaust gases 94 produced at the power generation system 14 (e.g., by the engine) are sent to the feedstock preparation system 20, where the hot exhaust gases 94 may be used to dry the biomass fuel source 22. Exhaust gases 96 are then discharged from the system 10 via a stack or similar feature.

Figure 2:
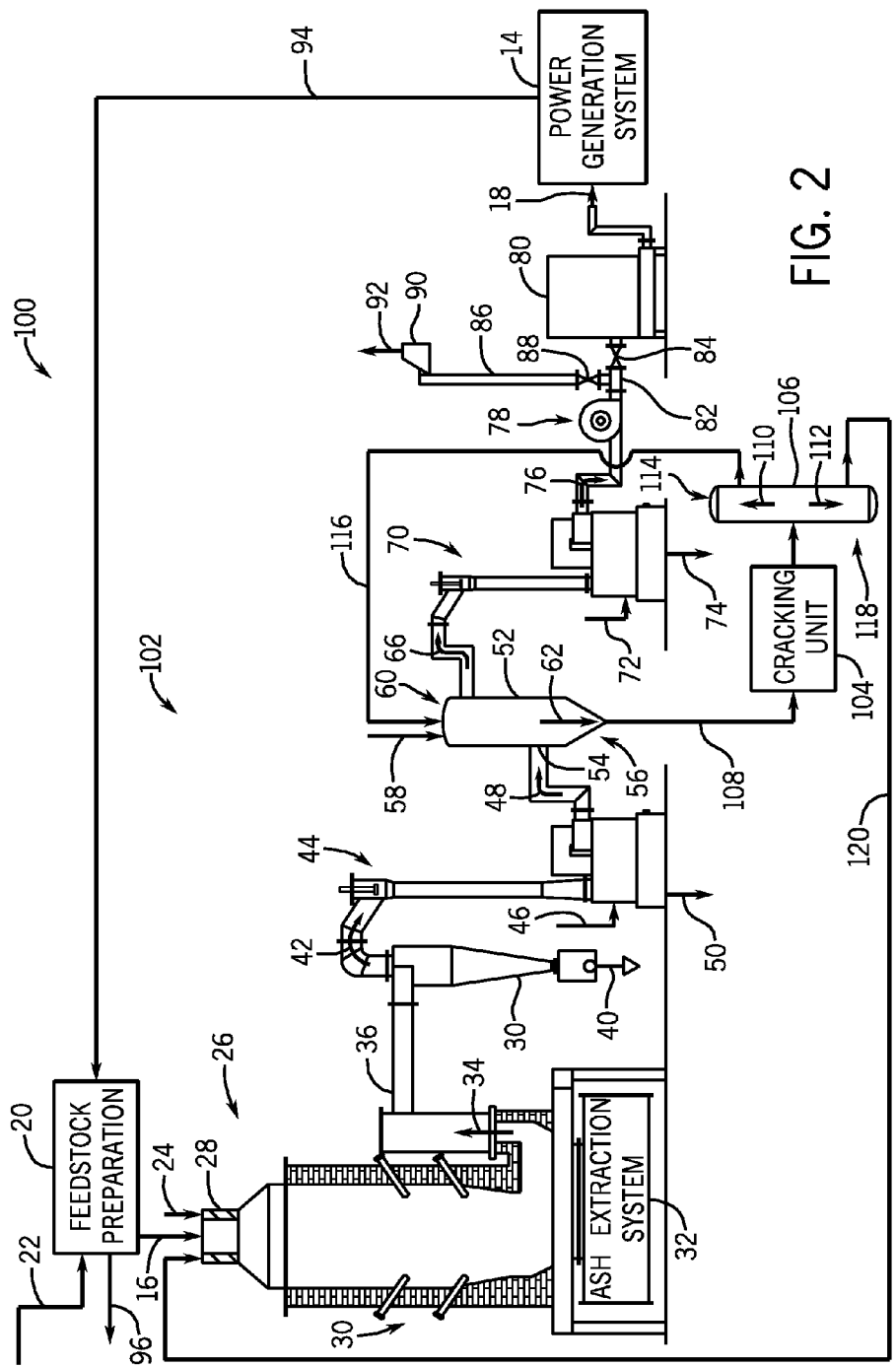
FIG. 2 is a schematic illustration of an embodiment of the biomass gasification system of FIG. 1 depicting the absorber fluidly coupled to features for cracking and recycling the tar separated from the producer gas.

As shown in FIG. 1, the stream 62 of solvent and tar may be recycled to the biomass gasifier 26 as a feed source, which may increase the efficiency of the system 12. FIG. 2 depicts another embodiment of a plant system 100 having a biomass gasification system 102 integrated with the power generation system 14. However, the biomass gasification system 102 includes a cracking unit 104 and a separation unit 106 (e.g., one or more distillation columns) that can be used to crack at least some of the tar components. In this way, certain features may be utilized to generate a cracked solvent mixture that may be used as a source of make-up solvent, rather than simply disposing of the separated tar. In particular, the stream 62 of solvent and tar exiting the contactor 52 can be directed through a conduit 108 to the cracking unit 104, which generates a cracked solvent mixture, and the separation unit 106, which separates the cracked solvent mixture, prior to recycle of the tar to the gasifier 26.

The cracking unit 104 is configured to crack at least a portion of the tar components in the stream 62 of solvent and tar to generate smaller molecules from the larger tar molecules. The separation unit 106 is configured to separate the larger molecules from the smaller molecules using one or more separation techniques, such as distillation, gravity settling, decantation, and so on. The cracking unit 104 may include features for performing catalytic cracking, thermal cracking, steam cracking, or a combination thereof, on the tar and/or the solvent of the stream 62 of solvent and tar. During operation, the cracking unit 104 receives the stream 62 of solvent and tar from the contactor 52 via the conduit 108. The cracking process within the cracking unit 104 breaks carbon-carbon bonds of certain components within the stream 62 of solvent and tar to produce a first set of molecules 110 and a second set of molecules 112, which are separated in the separation unit 106. In one embodiment, the cracking unit 104 may be integral with the separation unit 106. That is, the cracking process and the separation process may be performed in concert.

Generally, the first set of molecules 110 includes molecules having a lower average molecular weight than those of the second set of molecules 112. For example, the first set of molecules 110 may include molecules having 9 carbons or less, such as molecules ranging in molecular size from those having 1 carbon to those having 9 carbons. As an example, the first set of molecules 110 may include methane, ethane, ethylene, propane, propylene, butane, butylene, and other light chain hydrocarbons. Moreover, certain of the first set of molecules 110 may be functionalized, such as with alcohols, aldehydes, carboxylic acids, esters, among others. Generally, the first set of molecules 110 may be referred to as "lights," and the second set of molecules 110 may be referred to as "heavies." That is, the first set of molecules 110 may have an average molecular weight that is between approximately 1 and 99% lower than the second set of molecules 112, such as between approximately 10 and 90, 20 and 80, 30 and 70, 40 and 60, or 50% lower. The separation unit 106 may use this difference in molecular weight/structure and, more specifically, physical and chemical properties, to separate the first set of molecules 100 from the second set of molecules 112. The separation in the separation unit 106 may be accomplished using boiling point differences, sublimation temperature differences, chemical affinity differences, or the like. In the illustrated embodiment, the first set of molecules 110, which may boil and/or sublime at lower temperatures than the second set of molecules 112, exit an upper portion 114 of the of the separation unit 106. Specifically, the first set of molecules 110 may be recycled to the upper portion 60 of the contactor 52 and used as solvent.

The second set of molecules 112, which may include tar molecules that remain uncracked, or cracked molecules having 10 carbon atoms or more, or a combination thereof, may exit proximate to a lower portion 118 of the separation unit 106. In the illustrated embodiment, the second set of molecules 112 enter and flow through a conduit 120 that directs the second set of molecules 112 to the inlet 28 of the gasifier 26. In certain embodiments, the second set of molecules 112 may crack and gasify within the gasifier 26. For example, the gasifier 26 may have any or a combination of features for catalytic cracking, catalytic gasification, as well as steam cracking.

In addition to, or in lieu of the features for removing tar described above with respect to FIGS. 1 and 2, present embodiments also provide approaches for removing tar from the blackwater stream 50 produced by the first scrubbing unit 44, rather than disposing of the blackwater or allowing certain tars to settle for separation. Indeed, the embodiments discussed below may be used in conjunction with any scrubbing unit included within the systems 10 and 100 described above with respect to FIGS. 1 and 2. Moving now to FIG. 3, a system 130 is illustrated diagrammatically as including a contactor 132 for contacting a solvent stream 134 with the blackwater stream 50 produced by the first scrubbing unit 44.

The contactor 132 may be any vessel for receiving the solvent stream 134 and the blackwater stream 50, and for contacting both streams to produce a combined stream 136 having a mixture of at least water, tar, and solvent. In accordance with certain embodiments, the solvent stream 134 may include any or a combination of solvents described above with respect to the solvent stream 58 of FIGS. 1 and 2. In the illustrated embodiment, the solvent stream 134 includes an organic solvent that is separable from water.

The system 130 also includes a separation vessel 138 disposed downstream from the contactor 132 and fluidly connected to the contactor 132 by a conduit 139. The separation vessel 138 is generally configured to separate water 140 from the mixture 142 of organic solvent and tar. Thus, the separation vessel 138 may be a distillation column, flash vessel, or any separation vessel that is configured to separate organics from non-organics. For example, the separation vessel 138 may selectively flash the water 140 away from the mixture 142 of tar and solvent, or may allow the water 140 to separate from the mixture 142 of tar and solvent based on immiscibility and density. In other words, the organics may be allowed to settle to a lower portion 144 of the vessel 138, while the water 142 rises to an upper portion 146 of the vessel 138. Of course, in embodiments in which the density of the water 140 is greater than the density of the tar and solvent 142, the water 142 may exit the lower portion 144 and the tar and solvent 142 may exit the upper portion 146.

In the illustrated embodiment, the water 140 exits the upper portion 146 of the separation vessel 138 and enters a conduit 148. The conduit 148 may return the water 140 to the first scrubbing unit 44 or any other feature that may utilize or store water. For example, the water 140 may be sent to a storage tank, an acid gas removal unit, a steam generation unit, a heat exchanger, or any combination of these features.

The mixture 142 of tar and solvent, as noted above, settles to and exits the lower portion 144 of the separation vessel 138 through a conduit 150. The conduit 150 fluidly connects the separation vessel 138 to a cracking unit 152. The conduit 150 therefore directs the tar and solvent 142 to the cracking unit 152, which is generally configured to crack the tar and, in some embodiments, the solvent, to produce a cracked stream 154. Generally, the cracking unit 152 is configured to crack these materials using catalytic cracking, thermal cracking, and/or steam cracking as described above with respect to the cracking unit 104 of FIG. 2. Therefore, the cracked stream 154 includes a first set of molecules 156 and a second set of molecules 158. The first set of molecules 156 has a lower molecular weight than the second set of molecules 158.

The cracking unit 152 may be integral with, or fluidly connected to a separation vessel 160 that is configured to separate the first set of molecules 156 from the second set of molecules 160. The separation vessel 160 may use differences in the chemical and/or physical properties of the first and second sets of molecules 156, 158 to perform this separation. The properties may include boiling temperatures, sublimation temperatures, chemical affinity, and/or density, among others, to perform the separation. The first set of molecules 156 exits an upper portion 162 of the separation vessel 160, and the second set of molecules 158 exits a lower portion 164 of the separation vessel 160.

In the illustrated embodiment, the first set of molecules 156 exits the upper portion 162 of the separation vessel 160 and enters into a conduit 166. The conduit 166 fluidly connects the separation vessel 160 with the contactor 132, such that the first set of molecules 156 acts as make-up solvent for the tar separation process. In other embodiments, the conduit 166 may direct the first set of molecules 156 to a storage tank or an engine or a turbine to be used as fuel.

The second set of molecules 158 exits the lower portion 164 of the separation vessel 160 and enters a conduit 168 fluidly coupling the separation vessel 160 with the biomass gasifier 26. Thus, the second set of molecules 158 is recycled back to the gasifier 26, where it may undergo cracking and, advantageously, act as additional feed to the gasifier 26 to generate producer gas. In other embodiments, the second set of molecules 158 may be directed to other plant or system features, such as a storage tank, a processing plant, or a chemicals production facility.

In certain embodiments, it may be desirable to crack the tar and solvent 142 in situ within the gasifier 26, rather than providing the tar and solvent 142 to a separate cracking feature. Accordingly, the present embodiments also provide systems that use the conditions within the gasifier to crack tar formed during the gasification process. FIG. 4 illustrates an embodiment that may be used in conjunction with, or in lieu of, the tar removal features of systems 10 and 100, shown in FIGS. 1 and 2. Specifically, FIG. 4 illustrates an embodiment of a system 180 that includes the contactor 132 and the separation vessel 138, as described above with respect to FIG. 3. However, rather than directing the mixture 142 exiting the separation vessel 138 to a cracking unit, the system 180 includes a conduit 182 that directs the mixture 142 exiting the separation vessel 138 to the gasifier 26. In this embodiment, the mixture 142 of tar and solvent 142 is directed through the conduit 182 and is used as feed to the gasifier 26, where it may be cracked and/or gasified.

Figure 3:
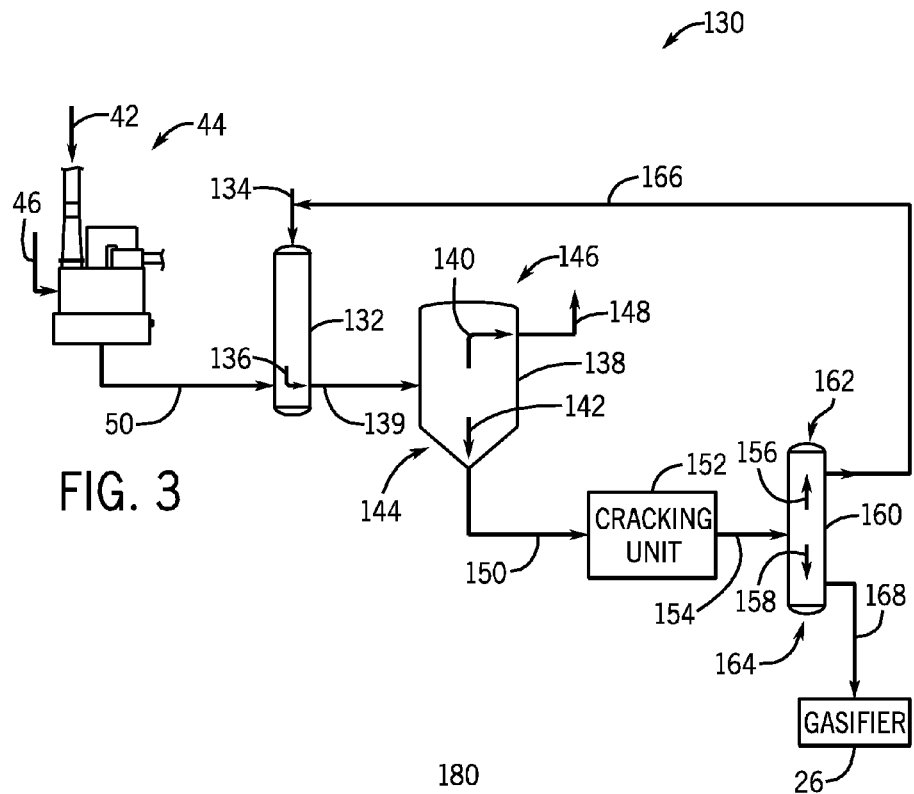
FIG. 3 is a schematic illustration of an embodiment of a system for removing, cracking, and recycling tar from a stream of black-water produced by a scrubbing unit of a biomass gasification system.
Figure 4:
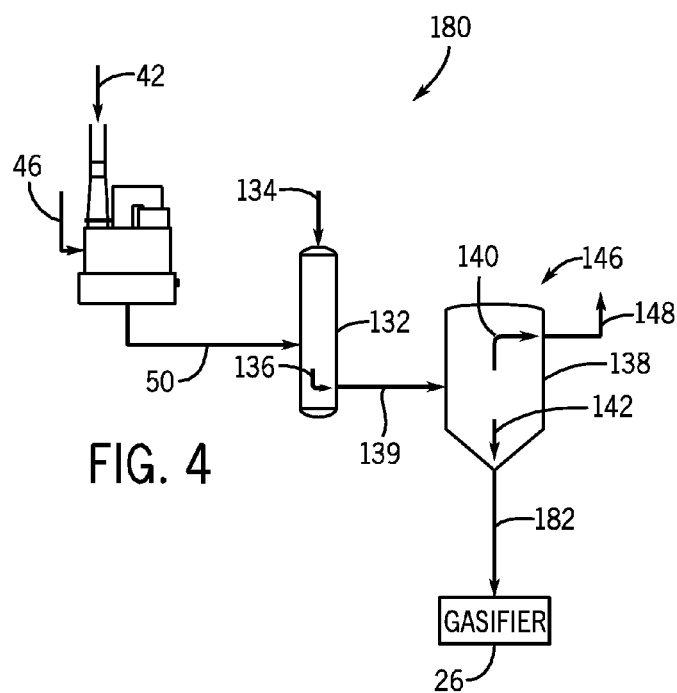
FIG. 4 is a schematic illustration of an embodiment of a system for removing and tar from a stream of black-water produced by a scrubbing unit of a biomass gasification system.
Figure 5:
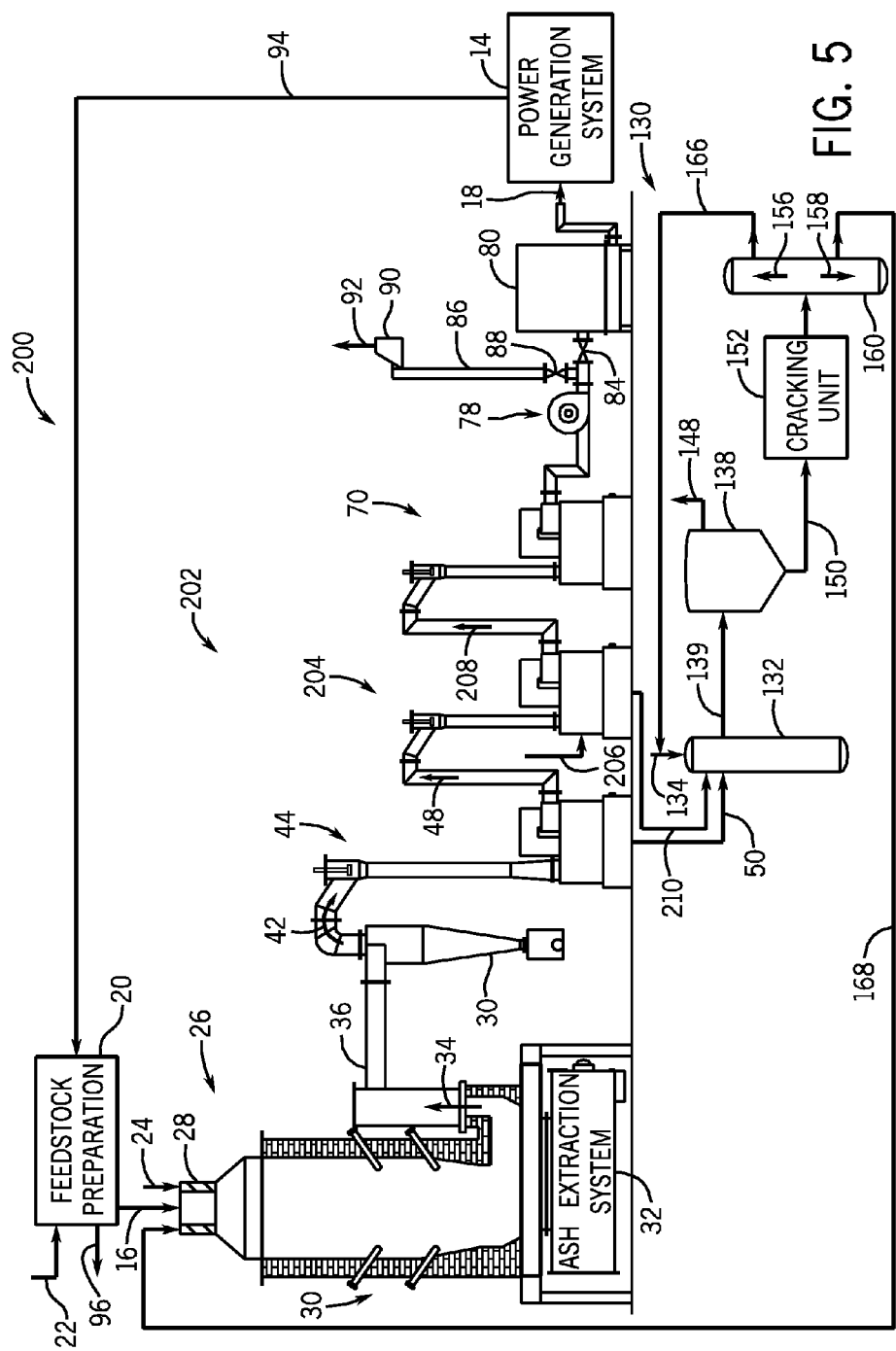
FIG. 5 is a schematic illustration of an embodiment of a biomass gasification system integrated with a black-water treatment system, the black-water treatment system having an absorber configured to remove at least a portion of tar from black-water produced by the treatment of a producer gas and a tar cracking unit configured to crack the tar.

In certain embodiments, it may be desirable to use the system 130 of FIG. 3 or the system 180 of FIG. 4 within a gasification system not having the contactor 52. Accordingly, FIG. 5 illustrates a system 200 that includes a biomass gasification system 202 that includes a second scrubbing unit 204, rather than a contactor 52. The second scrubbing unit 204 is disposed downstream from the first scrubbing unit 44 but upstream of the chilled water scrubbing unit 70. The second scrubbing unit 204 receives the second gas mixture 48 and a stream of water 206. The stream of water 206 is contacted with the second gas mixture 48 (e.g., as an aerosol) to scrub and, in some embodiments, cool the second gas mixture 48 to produce a third gas mixture 208 and a stream of blackwater 210. Thus, the third gas mixture 208 has a lower concentration of tar compared to the second gas mixture 48, and may have a lower temperature. As shown in FIG. 5, the system 202 includes three scrubbing units 44, 204, and 70. However, in other embodiments, any number of one or more scrubbing units may be included in the biomass gasification system.

In the illustrated embodiment, the blackwater 210 from the second scrubbing unit 204 is provided to the contactor 132 as a source of tar and water. However, in other embodiments, the aqueous waste from the second scrubbing unit 204 may be sent to another water treatment or water storage unit or facility. The blackwater 210, as illustrated, is sent to contactor 132 and may be combined with the blackwater stream 50 from the first scrubbing unit 44. The operation of the system 130 may be performed as described above with respect to FIG. 3, with the second set of molecules 158, generated by cracking the solvent and/or the tar, being recycled to the gasifier 26. As noted above, the first set of molecules 156 is used as make-up solvent to the contactor 132. Further, in other embodiments, the blackwater 50 from the first scrubbing unit 44 and/or the blackwater 210 from the second scrubbing unit 204 may be directed to the system 180 shown in FIG. 4, rather than to the system 130 shown in FIG. 3.

Returning to the operation of the biomass gasification system 202, the third gas mixture 208 is sent to chilled water scrubbing unit 70, where the producer gas within the gas mixture is scrubbed, chilled, filtered, and combusted as described above with respect to FIG. 1. In certain embodiments, however, the third gas mixture 208 may be sent to one or more additional scrubbing units, for example in situations where the gas mixture produced by the gasifier 26 contains relatively high concentrations of tar. In such embodiments, any one or a combination of these additional scrubbing units may be integrated with the system 130 (or system 180) in the manner described above.

As described above, the disclosed embodiments provide systems for contacting a producer gas mixture generated by a biomass gasifier with a solvent to remove at least a portion of the tar within the mixture. These systems may provide technical advantages over the use of cyclones, aqueous scrubbing units, and/or filters alone for the purification of producer gas. For example, the systems may allow solvent to selectively absorb or dissolve tar contained within a gas mixture, thereby reducing the concentration of the tar components to a greater extent than typical configurations. Moreover, because the solvent may, in some embodiments, be an organic solvent, the resulting mixture of solvent and tar components may be recycled to a gasifier. Therefore, the embodiments disclosed above may afford certain technical advantages such as increased throughput, increased plant efficiency, and/or producer gas having lower tar concentrations, among others, over existing systems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A biomass gasification system, comprising:
a reactor configured to gasify a biomass fuel in the presence of air to generate a producer gas;
an absorber configured to receive a mixture of the producer gas and tar and to absorb the tar into an organic solvent to produce treated producer gas and a rich solvent mixture containing at least a portion of the tar;
an organic solvent source having the organic solvent and coupled to the absorber via an organic solvent flow path, wherein the organic solvent source and the organic solvent flow path are configured to direct the organic solvent into the absorber;
a recycle path coupling a first output of the absorber with the reactor;
a cracking unit positioned along the recycle path and configured to break carbon-carbon bonds in the rich solvent mixture to generate a cracked solvent mixture;
a separation unit positioned along the recycle path and configured to separate the cracked solvent mixture into a first stream comprising a first plurality of hydrocarbons and the organic solvent and a second stream comprising a second plurality of hydrocarbons, wherein the first stream has a lower average molecular weight than the second stream;
a first recycle line configured to direct the first stream to the absorber; and
a second recycle line configured to direct the second stream to the reactor.

2. The biomass gasification system of claim 1, wherein the absorber is configured to absorb the tar into the first plurality of hydrocarbons.

3. The biomass gasification system of claim 1, wherein the first plurality of hydrocarbons have a lower molecular weight than the second plurality of hydrocarbons.

4. The biomass gasification system of claim 1, wherein the first plurality of hydrocarbons comprise hydrocarbon molecules having 9 carbon atoms or less.

5. The biomass gasification system of claim 1, wherein the separation unit comprises one or more distillation columns.

6. The biomass gasification system of claim 1, wherein the organic solvent comprises xylene, toluene, or benzene, or a combination thereof.

* * * * *